United States Patent
King

(12) 
(10) Patent No.: US 6,300,899 B1
(45) Date of Patent: *Oct. 9, 2001

(54) FIXED SITE DATA-AIDED GPS SIGNAL ACQUISITION METHOD AND SYSTEM

(76) Inventor: Thomas M. King, 9283 S. Stanley Pl., Tempe, AZ (US) 85284

(*) Notice: Subject to any disclaimer, the term of this patent is extended or adjusted under 35 U.S.C. 154(b) by 0 days.

This patent is subject to a terminal disclaimer.

(21) Appl. No.: 09/253,662

(22) Filed: Feb. 19, 1999

(51) Int. Cl.$^7$ .................................................... H04B 7/185
(52) U.S. Cl. ................................ 342/357.12; 342/357.05
(58) Field of Search ....................... 342/357.01, 357.05, 342/357.06, 357.12; 701/213

(56) References Cited

U.S. PATENT DOCUMENTS

| | | |
|---|---|---|
| 5,148,452 | 9/1992 | Kennedy et al. . |
| 5,610,984 * | 3/1997 | Lennen ................................ 380/49 |
| 5,663,734 | 9/1997 | Krasner . |
| 5,781,156 | 7/1998 | Krasner . |
| 5,825,887 * | 10/1998 | Lennen ................................ 380/34 |

* cited by examiner

Primary Examiner—Dao Phan
(74) Attorney, Agent, or Firm—Nicholas C. Hopman; John J. King

(57) ABSTRACT

A fixed site data-aided system and method of GPS signal acquisition from a plurality of broadcasted GPS signals includes lengthening a pre-detection integration interval so that weak signals can be detected by operating coherently on captured signals. Coherency is ensured by relying on the predictability of the satellite signal's data pattern. To speed up both the real-time and off-line correlation process a reduced code replica search space is derived dependent on a reference code phase delay and reference Doppler shift (417), and optionally local time (509) received from a fixed position reference site. Also, the off-line correlation process can be run at a speed significantly faster than the real-time correlation process. A position fix can be either computed locally or remotely at the fixed position reference site.

27 Claims, 7 Drawing Sheets

FIXED SITE DATA-AIDED GPS SIGNAL ACQUISITION METHOD AND SYSTEM

The present invention is related to U.S. patent application Ser. No. 09/253,318, AUTONOMOUS DATA-AIDED GPS SIGNAL ACQUISITION METHOD AND SYSTEM, and U.S. Pat. No. 6,121,923, FIXED SITE AND SATELLITE DATA-AIDED GPS SIGNAL ACQUISITION METHOD AND SYSTEM, both of which were filed on the same day herewith and are assigned to the assignee of the present invention, and both of which are incorporated herein by reference.

FIELD OF THE INVENTION

The present invention relates generally to Global Positioning System (GPS), and more specifically, to improved signal detection acquisition time and level signal detection for GPS receivers using fixed-site data to aid the GPS position determination process.

BACKGROUND OF THE INVENTION

According to the Federal Communications Commission (FCC) cellular radiotelephone calls must be geographically locatable by the year 2001. This capability is desirable for emergency systems such as E911. The FCC requires stringent accuracy and availability performance objectives and demands that cellular radiotelephones be locatable within 125 meters 67% of the time. This threshold has been difficult to achieve using traditional TOA/TDOA (Time Of Arrival/Time Difference Of Arrival) infrastructure technology.

In order to include GPS in wireless portable devices such as cellular radiotelephones, performance needs to be improved in several areas including weak signal detection, acquisition time and energy use for operating power. Regarding weak signal detection, users of cellular radiotelephones have become accustomed to making calls indoors, and traditional processing of GPS signals will not accommodate the attenuation caused by most buildings. Since these GPS receivers capture signals from satellites at quite an extraordinary distance, any objects in the direct line of sight between the GPS receiver and the satellites often cause malfunction because the signal transmitted by the satellites is attenuated by the interfering object making it difficult for the GPS receiver to receive them. Trees, buildings, and other high-profile objects can cause line of sight interference resulting in the problem of weak, or low signal detection.

Regarding accuracy, differential GPS approaches may work but are complex and costly. Moreover they don't fix the weak signal problem.

A major problem with traditional GPS signal processing techniques has to do with bandwidth and signal power. The GPS satellites transmit a very weak signal, guaranteed signal levels are only −130 dBm on the surface of the earth. Actual signals as measured on the earth's surface show signal levels of about −125 dBm. The acquisition threshold of current automotive and consumer grade handheld GPS receivers is on the order of −137 dBm, thus the link margin for signal acquisition is only about 7 to 12 dB.

The sequential detection algorithm is used my almost every GPS receiver on the market in order to acquire the CDMA signals. One can extend the acquisition threshold to lower levels by lengthening the pre-detection integration (PDI) interval at the expense of acquisition time. Even so, there is a maximum PDI of about 10 milliseconds (100 Hz bandwidth) beyond which the sequential detection process breaks down. This is because the GPS signal structure includes BPSK modulated navigation data (50 BPS) transmitted on top of the 1.023 MHz spreading code that ultimately limits how long one can coherently integrate in order to increase the SNR. Beyond 10–20 ms (one data bit time), the data bit transitions cause the integration sum to be reduced or go to zero, depending on the phase relationship of the integration period relative to the data bit transition.

Also, contemporary Global Positioning System (GPS) receivers are often embedded within portable devices where energy is derived from a battery. These portable devices include devices such as cellular radiotelephones, PDAs (Personal Digital Assistants), portable computers, surveying devices and other devices that make use of information provided by a GPS receiver. When these GPS receivers operate, they consume a substantial amount of energy, which depletes energy from the battery that could be made use of by the co-embedded functions. If GPS correlation can be done faster, battery energy can be conserved because the GPS receiver can be turned off when correlation is achieved. Prior art schemes have inadequately addressed energy conservation.

What is needed is an improved GPS signal acquisition method and system that can operate with weaker signals and lock onto satellite signals faster than prior art schemes particularly for E911 calls.

DETAILED DESCRIPTION OF THE PREFERRED EMBODIMENT

Figure 1:
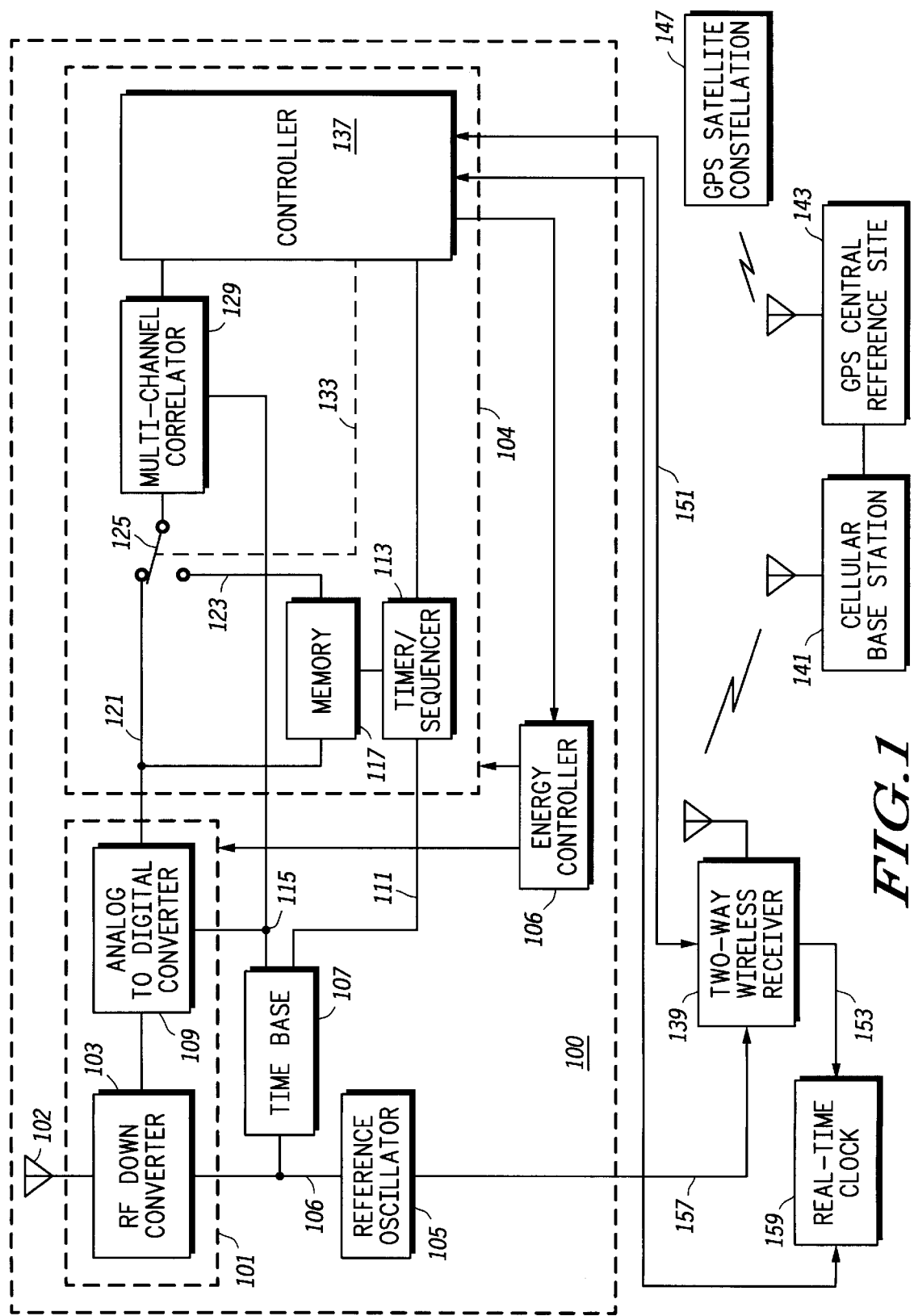
FIG. 1 is a system block diagram of a GPS receiver in accordance with a preferred embodiment of the invention.

An improved system and method of GPS signal acquisition based on a data-aided approach is described. Significant signal detection improvement is accomplished by capturing and operating coherently on captured GPS satellite signals. By operating on these captured signals off-line, weak signals can be detected by lengthening a pre-detection integration interval. Coherency is ensured by relying on the predictability of the satellite signal's data pattern. To speed up both real-time and off-line correlation processes a reduced code replica search space is used. The reduced code replica search space is derived dependent on a reference code phase delay and reference Doppler shift, and optionally local time received from a fixed position reference site. Also, the off-line correlation process is run at a speed significantly faster than the real-time correlation process. A position fix can be either computed locally or remotely at the fixed position reference site. The first signal to lock associated with the real-time code phase delay and the off-line code phase delay is sent to the fixed position reference site. By applying all of the described techniques position determining data can be typically acquired within a few seconds rather than tens of seconds, even in weak signal areas. This allows for energy conservation—an important feature in portable devices, and makes E911 service viable in a portable product.

Before delving into the precise embodiments, an overview of several aspects of the improved method and system approach taught will be presented. The method and system consists of a wireless communications receiver, such as a GPS enabled CDMA radiotelephone that communicates with an infrastructure for both voice and data as well as to exchange data between a GPS sensor and the GPS central reference site (CRS), that is geographically located within a few hundred kilometers.

Information transmitted to the wireless communications receiver includes GPS information such as which satellites are visible at the CRS, and their associated Doppler and code phase. The Doppler and code phase can be transmitted at a single instant in time to a single mobile user, or periodically broadcast to all mobiles as coefficients to a curve fit so that the wireless communications receiver can reconstruct a model of the parameters as a function of time.

The wireless communications receiver has signal processing elements that sequentially search out the code phase and Doppler space of the GPS signal in order to find maximum correlation to each visible satellite. In one embodiment it uses the aiding information sent by the CRS to greatly limit the search space necessary to find the signal. The wireless communications receiver is preferably a CDMA radiotelephone, TDMA radiotelephone, or two-way paging device in which accurate time is known. For example, the CDMA radiotelephone has GPS System time available inside a handset because the CDMA infrastructure transmissions are all synchronized with GPS system time. The wireless communications receiver transfers this system time into the radiotelephone and makes it available to GPS receiver, perhaps through a local real-time clock. The aiding information that is sent from the GPS central reference site is time synchronized with GPS time so that the same time reference is used at each end.

The time reference in the wireless communications receiver is the same as that at a cellular base station, but the transmission time delay between the base station and the wireless communications receiver is not counted. Thus, the time reference clock in the wireless communications receiver is delayed in time from the reference clock in the GPS central reference site (and cellular base station) by the propagation time between the cellular base station and the wireless communications receiver. This time is given by T1=R/SOL, where R is the range between the base station and wireless communications receiver and SOL is the speed of light. Given that the wireless communications receiver is located at some geographical location (X,Y,Z) offset from the cellular base station, T1 can also be expressed as T1=SQRT(X^2+Y^2+Z^2)/SOL.

The time delay, or code phase difference, of the GPS signal as measured at the wireless communications receiver and cellular base station is also a function of the geometry of the satellite and the location offset of the wireless communications receiver. Given that the base station is at the origin (0,0,0) and the wireless communications receiver at (X,Y,Z), and that the satellite is at some elevation angle E and azimuth angle A, the equation for the delay difference as measured between the base station and the wireless communications receiver is given by T2=dot product(U, X)/SOL. Where U is the unit vector pointing from the cellular base station to the satellite, and X is the offset vector from the cellular base station to the wireless communications receiver (X-vector is in fact the (X,Y,Z) coordinates of the wireless communications receiver).

The observed time difference of the arrival of the GPS signal at the wireless communications receiver and cellular base station is then simply Td=T1+T2.

Figure 6:
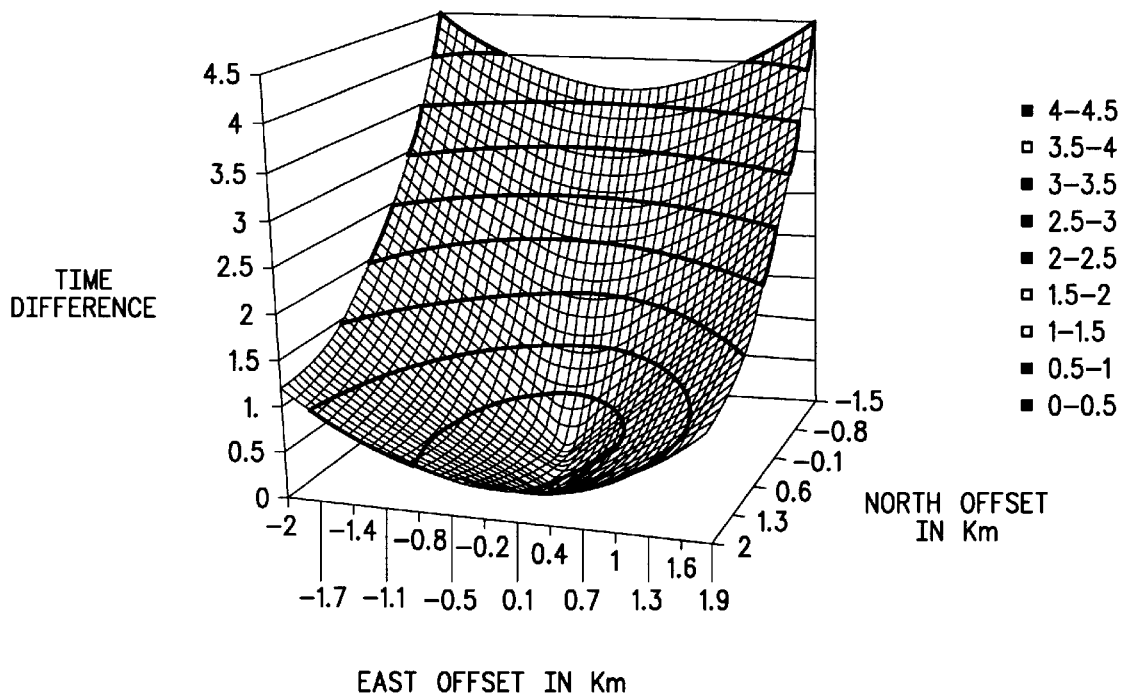
FIG. 6 is a graph illustrating a time difference observable as a function of a wireless communications receiver location with a satellite located at an elevation of 35 degrees and an azimuth of 180 degrees.

FIG. 6 is a graph illustrating a time difference observable as a function of a wireless communications receiver location with a satellite located at an elevation of 35 degrees and an azimuth of 180 degrees, and shows the shape of the time difference observable Td as a function of wireless communications receiver (X,Y) location. The X coordinate is the north-south offset in meters. The Y coordinate is the east-west offset in meters. The cellular base station is located at the origin (0,0).

Figure 7:
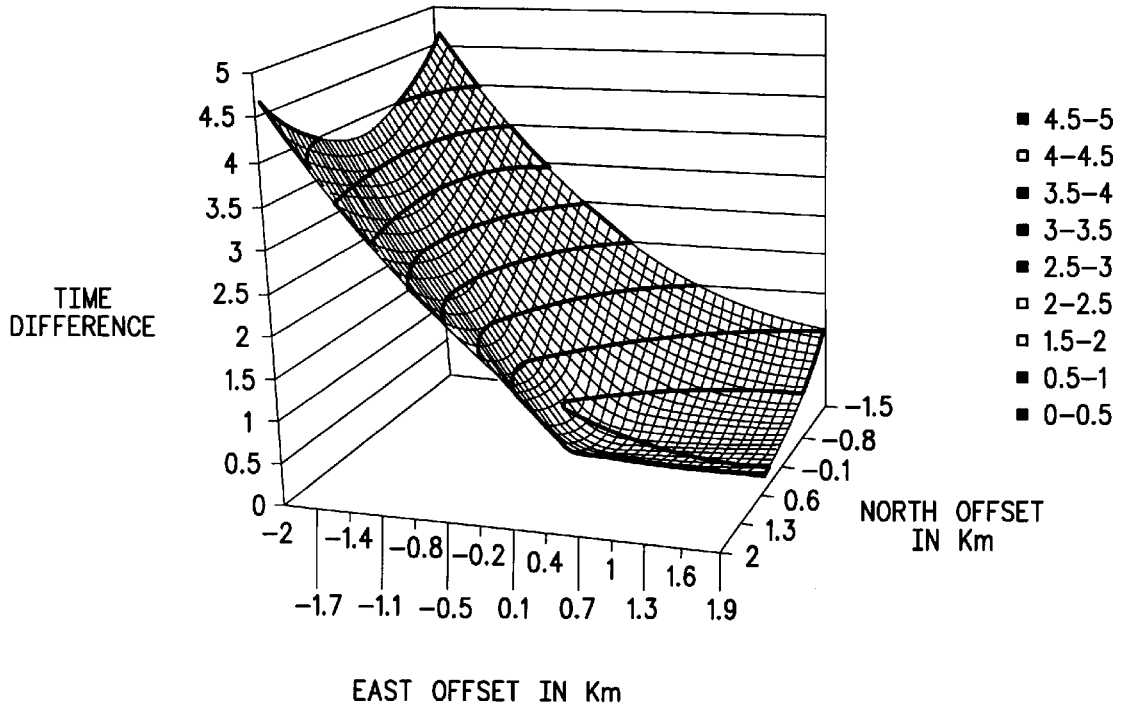
FIG. 7 is a graph illustrating a time difference observable as a function of a wireless communications receiver location with a satellite located at an elevation of 25 degrees and an azimuth of 90 degrees.

FIG. 7 is a graph illustrating a time difference observable as a function of a wireless communications receiver location with a satellite located at an elevation of 25 degrees and an azimuth of 90 degrees.

The shape of the surfaces for each satellite is known ahead of time before the wireless communications receiver acquires the GPS signals. The central reference station can transmit satellite location (either in the form of satellite ephemeris data to the wireless communications receiver, or in the form of satellite azimuth/elevation angle data) so that the wireless communications receiver has knowledge of the curve shapes. In addition, the CRS transmits the observed code phases at the CRS either as time-tagged instantaneous measurements or as coefficients to a curve fit for later reconstruction. Once the code phases the CRS is known, then the time difference from the plots can be used to predict the observed time difference in the wireless communications receiver as a function of location.

For a satellite that is positioned directly overhead, the shape of the surface is in the form of a cone. With a low angle satellite, the shape is a stretched out trough, whose long dimension is in the direction of the satellite. Consequently, what is proposed is a satellite search method that exploits the a-priori surface shapes and observed code phases at the CRS to greatly limit and find all GPS signals faster than is possible by separate independent searches on each satellite signal.

The search process is as follows. Start with the high-angle satellites because the rate of change of the time difference is most balanced in all directions. Find the first high angle satellite by using multiple channels to look for it (in a 12 channel GPS receiver architecture, twelve independent searches can be applied to the parallel search problem, the entire code phase uncertainty region is divided into 12 parallel independent searches). After the first satellite is found, the location of the wireless communications receiver is then limited to those X,Y locations that exhibit a constant time difference observable in code phase as defined by the surface for that satellite. The set of possible locations forms a squashed ring whose shape is known.

A second satellite can then be found by testing all possible locations on the ring of possible solutions, scanning for the second satellite at only those code phase delays that are possible if the user is located on the ring defined by the first satellite.

After two satellites are found, then the time difference observed between the CRS and the wireless communications receiver can be used to pinpoint the approximate location to up to two maximum possible locations (the intersection of the two curved surfaces at the measured time delay for each satellite). It should be noted that it is possible that one of the two possible locations is outside the coverage zone of the particular cellular base station. There are a number of cases in which there is only one practical location because one of the two solutions is outside of the coverage zone (more likely when at least 1 satellite has a low elevation angle).

The search process then proceeds to find all possible other satellites by testing each of the maximum of two possible locations to find at least one more satellite signal. The code phase search range for the third and all remaining satellites is very small, on the order of a few chips maximum. Once a third signal is located, and the ambiguity (if any) is removed, then all other remaining satellites can be quickly found because the time delays are then defined by the shape of their individual surfaces. Once all satellites are found, then a combined position solution including all range measurements can be computed providing a highly accurate solution.

It is through this method that finding the code phase delay to all possible satellites can occur much more rapidly than is possible if each satellite is searched independently, as is the case with autonomous GPS. The communication of CRS-measured data from the CRS to the wireless communications receiver enables the improvement.

The data transmitted includes code phase, Doppler, and either satellite position information (in the form of ephemeris) or satellite azimuth/elevation angle data so that the wireless communications receiver can construct a model of the surfaces shown in the figures.

In the first-described embodiment reference data provided by the GPS central reference site 143 is used to significantly speed up the position determination process for the mobile. Note that the term mobile is used to represent a combination of the GPS receiver 100 and the CDMA radiotelephone 139 (or another type of wireless communications receiver—such as a pager) which are assumed to be mounted for example in a vehicle or carried as a portable device by a user. The process by which the code phase measured at the central reference site assists the mobile in predicting the code phase measurement in the mobile has been previously described. It is this prediction that allows the mobile to greatly constrain the code phase search space, which allows the mobile to find the satellite signal(s) quickly.

At the GPS central reference site 143, let the code phase for one of the satellites be Cp at reference time Tr. Let the Doppler for the same satellite at Tr be D.

At the same time Tr, a mobile station that is geographically located near the central reference site will show approximately the same code phase measurement at the same time Tr. A propagation time difference between the satellite to mobile and satellite to central reference site signal paths cause the difference in the two code phase measurements. The CRS to mobile path is included because the timebase of the mobile is synchronized to the time indicated in the received signal from the cellular base station, which varies as a function of the propagation time between the base station to mobile.

The code phase can be described as one of 1023 possible discrete time bins, each time bin consisting of approximately 300 meters, or 1 PN code bit (also called 1 chip). In a typical radiotelephone application, the distance between the Cellular Base Station and the mobile is on the order of 10 km maximum, thus the maximum difference in code phase is no more than +/−10 km /300 m=+/−33 chips. The uncertainty is a function of the cosine of the elevation angle, thus a simple relationship of the code phase uncertainty is given by +/−33*cos(el) chips, where el is the elevation angle of the satellite above the horizon.

In CDMA radiotelephone applications, the propagation time of the signal between the base station and the mobile adjusts the time in the wireless communications receiver by the same amount, thus the measurement time in the mobile is uncertain by the communications base station to mobile propagation distance.

Since the location of the mobile is not known, the propagation time distance between the mobile and cellular base station is also not known, and this uncertainty adds between zero and 33 additional chips of uncertainty (given a 10 km maximum communications distance) to the code phase measurements.

Consequently, given a cell sector size of no more than X meters, one can write a relationship that says the initial code phase measurement at the mobile can be predicted to fall between an upper code phase measurement and a lower code phase measurement.

Specifically, let $$Cpm=Cp+D*(Tm-Tr)/1540+1023*fmod((Tm-Tr),0.001);$$

where Cpm is the code phase measurement at the mobile from measurements taken at the central reference site, assuming the mobile is located at the central reference site.

CPm and Cp are in units of chips;
D is in units of cycles per second;
Tm and Tr are in units of seconds;

The constant 1540 is the number of cycles per chip of the GPS signal. The last term represents the fractional code phase that remains in the time difference, modulo 1 millisecond. Then, the upper (CpmMax) and lower (CpmMin) code phase search window given an unknown position of the mobile (other than it is within X meters of the central reference site) is given by:

$$CPmMax=Cpm+X/300*(1+\cos(el));$$
$$CPmMin=Cpm+X/300*(1-\cos(el));$$

where Cpm, CpmMax and CpmMin are in chips, X is in meters.

Higher angle satellites project the smallest code search range (cosine function is smallest with larger elevation angles). Consequently, it is preferred that the search begin with the highest satellites in the sky and progress to the lowest satellites, which will then limit the time it takes to find the first two satellites.

Another embodiment uses off-line correlation to extend a signal acquisition threshold to lower levels by lengthening the pre-detection integration (PDI) interval at the expense of acquisition time. To accomplish this, a portion of the broadcasted GPS signal is captured into a memory and then later replayed into a GPS correlator. Since, to get maximum benefit from this approach the GPS correlator needs to be operating on a coherent signal, the capture of the GPS signal must be well controlled. Coherent signal capture is an important aspect of a preferred embodiment.

By using local time to find the coherent satellite data, the off-line correlator can find the signal many times faster than with more traditional approaches.

Before the details of a method embodiment of the improved approach are detailed a description of a system platform will be detailed.

A system block diagram of a GPS receiver 100 capable of detecting signals at greatly reduced levels is shown in FIG. 1. A GPS front-end 101 includes an antenna 102 coupled to a RF (Radio Frequency) down converter 103. The RF down converter 103, under the direction of a reference oscillator 105 drives an analog to digital converter 109. The RF down converter 103 receives GPS signals broadcasted by any of several satellites in sight, and a time base 107 schedules the analog to digital converter 109 to provide a digitized signal 121 as well as providing proper clocking signals to the correlator 129 and timer/sequencer 113. The digitized signal 121 is an Intermediate Frequency (IF) signal.

A computational back-end 104 includes a memory 117 coupled to the analog to digital converter 109 for receiving the digitized signal 121. A timer/sequencer 113 receives a timing reference signal 111 from the time base 107, and under direction of a controller 137 directs the memory to capture the digitized signal 121 and replay it to a multi-channel correlator 129 at a determined time. The time base 107 also provides a timing signal to direct the operation of the analog to digital converter 109 and the correlator 129. Note that the correlator is a multi-channel correlator as is conventional in GPS receivers. Each channel of the multiple channels tracks a particular satellite signal extracted from the digitized signal 121. A switch 125, actually one for each channel of the correlator 129, under control of the controller 137, via a selection signal 133, is configurable to provide either the digitized signal 121 or a signal 123 played back from the memory 117.

Once a satellite signal is captured into the memory 117, correlation can be used to search for the signal of interest using the known 50 BPS data pattern as a basis for data-aiding the acquisition algorithm and thus extending the acquisition threshold well below that previously possible.

When the received satellite signals are strong, standard GPS signal processing algorithms can be used to acquire and track the satellites continuously. Upon loss of conventional signal tracking due to urban canyon, foliage, or other blockage conditions, the switch mechanism 125 for the affected satellite channel can be selected to observe a recently recorded signal sample, and a data aided, or off-line correlator, can be used to scan for the signal at greatly reduced detection thresholds. Note that in certain applications, the receiver likely has already obtained the entire 50 BPS navigation message and thus already has pre-stored all the data and can use it to data-aid the acquisition of the signal stored in the memory 117. The signal can then be reacquired directly once the code phase and Doppler shift are obtained, or the data aiding scheme can obtain direct measurements of pseudorange.

It is important that any correlation channel be able to observe either the direct output (i.e., the real-time output) of the analog to digital converter 109 or the captured and stored output of the memory 117. It is also important that any channel be switchable to run at real-time speeds or at much faster than real-time speeds.

Received satellite signals can be captured into the memory 117 at a rate no slower than twice the PN code-chipping rate of 1.023 MHz, in order to preserve the signal's information. That is, the input to the memory 117 must be at least 2.046 MHz. Likewise, in playback mode, it should be recognized that the data can be played back from the memory 117 into the correlator at a rate that is much faster than the collection rate since the correlation process is then handled in a post-collection mode. Thus, the correlator can be run at rates that coincide with the fastest possible data rate supportable by the implementation of the correlator 129 and memory 117.

One alternate structure is a version of the same concept in which two correlators are used. A first correlator runs only in a real-time only mode and processes data directly from the A/D converter 121 directly as is done in traditional GPS sensors. A second correlator is then directly connected to the output of the memory 117 and only processes off-line stored signal. It is recognized that the two correlators can run simultaneously, the first correlator to achieve signal detection then used to produce the required code phase data. In addition, the second correlator can operate in a faster-than-real-time mode only since its inputs from memory 117 are not tied to the real-time data rate from the satellites. Consequently, a second correlator can process the data from memory 117 at rates that are commensurate with the processing speeds of modem CMOS circuits and support clocking speeds 10–100 times faster than originally used to collect the data.

In the embodiment of FIG. 1, The correlator can run in a real time mode at clocking speeds compatible with the real-time signal, or a high-speed mode compatible with the clocking speeds of the CMOS technology used. Typical CMOS circuits can easily process data from the memory 117 and the correlator at rates that are 10–100 times faster than that required to originally collect the data. That is, the correlator 129 and the memory 117 can operate at 20–200 MHz typically, causing an increase in the processing speed of 10–100 times that of the real-time process. Rapid signal detection can be achieved using this speed up process in playback mode. Since the bandwidth of the frequency space is about 5–10 Hz (given that a 100–200 millisecond long batch of data is stored in memory), the number of parallel search frequency bins is greatly increased. Therefore an approach for greatly increasing a rate at which the frequency bins can be checked is needed. In addition, the parallel channels of the correlator 129 that are used can also be used to speed up the frequency search process. Where typical correlators now contain up to 12 channels of independent correlators, it is possible to look for a limited number of satellites initially, using channels to search in parallel for the same satellite at either different Doppler frequencies or at different code phase delays.

The number of bytes of memory 117 establishes the maximum PDI that one can achieve, and therefore the signal processing gain that is available. Given a 1 bit sampler (one each for I and Q), and a sample rate of 2.1 MHz, Table 1 describes the sample interval size based on several conveniently sized memory 117 blocks.

| Memory size (bytes) | Samples Interval (milliseconds) |
|---|---|
| 8 K | 15.6 ms |
| 32 K | 62.4 ms |
| 128 K | 249.7 ms |

Several things limit the practical application of this approach. First, there is a practical limit to the amount of memory 117 that can be included in a low cost implementation. Second, as one lengthens the PDI, there is a narrowing of the effective bandwidth (to 1/PDI). As one narrows the frequency search bandwidth, more frequency bins are created that have to be tried during the two-dimensional detection scan over the code/frequency space. This increases the time to search for and lock onto the satellite signal. Third, the stability of the reference oscillator can also come into play at longer integration times if the bandwidth is narrowed enough to approach the short-term stability of practical low cost oscillators. For these reasons, a practical integration time of approximately 200 milliseconds (bandwidth of 5 Hz, corresponding to ten bits of the 50 BPS data message) is used here, and results in 24 dB of signal detection gain over a conventional GPS receiver. A memory size of 128K bytes provides almost 250 milliseconds of data-capture time. This gives enough signal overlap on the front and back end of the memory to capture the same 10 bits from every visible satellite (allowing for propagation delay differences due to geometry and for the drift in each satellite reference clock). Efficient code/frequency space search algorithms are required at this level in order to find the signals in a relatively short period of time.

The described off-line correlation architecture is ideal for inclusion into wireless, or two-way portable devices because the entire receiver can be powered off until a position fix is needed, and it provides the necessary signal processing gain for in-building operation and to overcome poor performance antennas. When a position fix is required, the GPS can be powered on, a memory sample taken at a time coincident with the arrival of the known data bits. Once the memory contains the sample, the GPS front-end can be powered off. The data-aided correlator is then powered and used to measure the code phase delays of all visible satellites in a matter of a few seconds. The code phases can then either be transmitted to a remote location for position fix computation, or a position fix can be computed locally. Offline position calculations are often done to implement differential correction that compensates for satellite emepheris and other system errors.

Returning to the description of FIG. 1, an energy controller 106 under the direction of the controller 137 manages energy provision to both the GPS front-end 101 and the computational back-end 104. After the computational back-end captures the digitized signal 121 into the memory 117 the energy controller 106 can shut down the GPS front-end 101. After the GPS receiver 100 either finds a position fix or after it transmits the code phase delays back to a fixed position reference site the energy controller 106 can shut down the computational back-end 104. This type of energy conservation is particularly critical in portable devices such as cellular radiotelephones and other hand-held devices.

A wireless two-way portable communications device, such as a CDMA radiotelephone 139 communicates with a cellular base station 141 for normal radiotelephone function as well as to request and receive reference data. This reference data includes time-tagged data including, reference code phase delays and reference Doppler shifts and code phases for satellites visible to the GPS central reference site. Note that local time is used by the CDMA radiotelephone 139 for its own operating purposes, and this time is stored in a local real-time clock 155, readable and writeable by the GPS controller 137. This aid data is provided to the cellular base station 141 via a GPS central reference site 143 in cooperation with the same GPS satellite constellation 147 that sends signals to the GPS receiver 100. The wireless transciever 139 includes a transciever function, a time output port 153, and a data in/out port 151. A local real-time clock circuit 155 can be set by the transciever 139 or by the GPS controller 137. When the GPS central reference site 143 send the reference data via the cellular base station 141 to the wireless transceiver 139, it is used by the GPS receiver via path 151 to aid in its correlation process. Next, information contained in the GPS satellite signal will be described.

Figure 2:
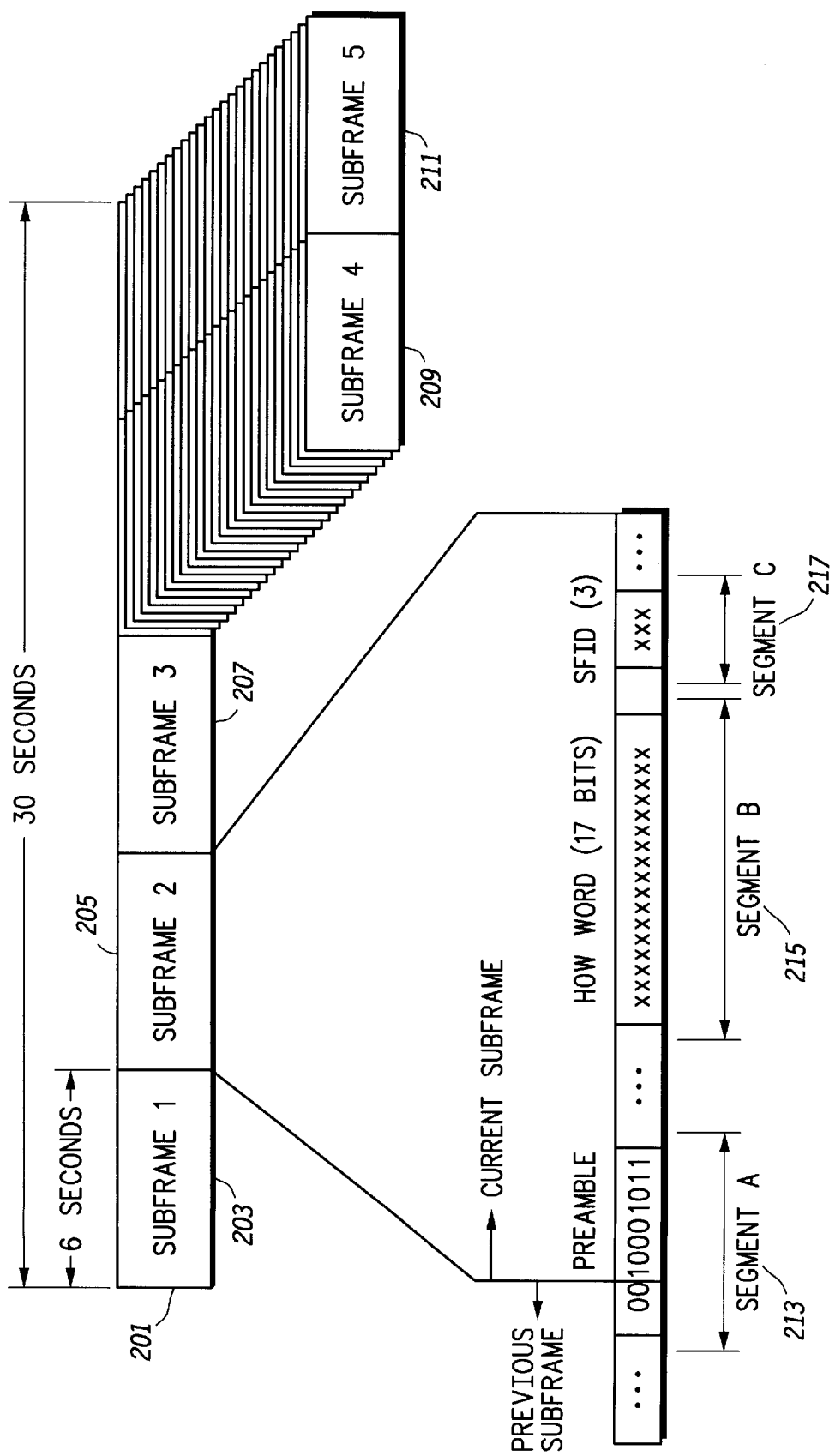
FIG. 2 is a diagram of a GPS satellite broadcast message.

FIG. 2 shows the message structure of a 50 BPS data sequence as transmitted by every GPS satellite. Each frame 201 is continuously broadcasted and consists of six-second subframes 203, 205, 207, 209, and 211. Note that subframes 4 and 5, 209 and 211 respectively each have twenty-five pages of data. Subframe 1 203 contains satellite clock correction coefficients, various flags and the age of the data. Subframe 2 205 and subframe 3 207 contain satellite ephemeris parameters. Subframe 4 contains an ionospheric model, UTC data, flags for each satellite indicating whether anti-spoofing is on or off, and almanac data and health for any satellites in excess of 24 in orbit. Subframe 5 contains almanac data and health of the first 24 satellites in orbit.

At the beginning of each six second subframe is the same 10 bit preamble, segment A 213, which is attached to the message to allow a GPS receiver's message decoding software to find message synchronization.

Each satellite's message timing is synchronous with all others in the constellation, thus the time of arrival of the signals on the ground of all satellite preambles is approximately the same, and varies only by about 30 milliseconds. The variability is caused mostly by geometry induced differences in the propagation delays, but also includes a small but controlled time bias for each unique satellite clock.

Any or all of the message segments shown in FIG. 2 (among others) can be used to push the pre-detection integration period to greater than 1 bit time. The preamble sequence is the same for every satellite and repeats every six seconds. Similarly, the HOW, or hand-over word segment B 215 is a time identifier, and it represents a time of the first preamble bit of the next to arrive subframe. Every HOW word is different from the previous by one count, is the same for every satellite, and is predictable as a function of time. Thus, the 17 bit HOW word can also be used to generate known data sequences that can be used to greatly extend the detectability of the signal.

GPS receivers measure a time of arrival (TOA) of signals impinging its antenna from multiple satellites. The CDMA signal structure of the received signal offers a convenient method of measuring the TOA through a correlation process by measuring a code phase delay that produces a signal maximum. A code discriminator refines the code phase measurements around the signal peak before being used for position fix computation purposes.

Figure 3:
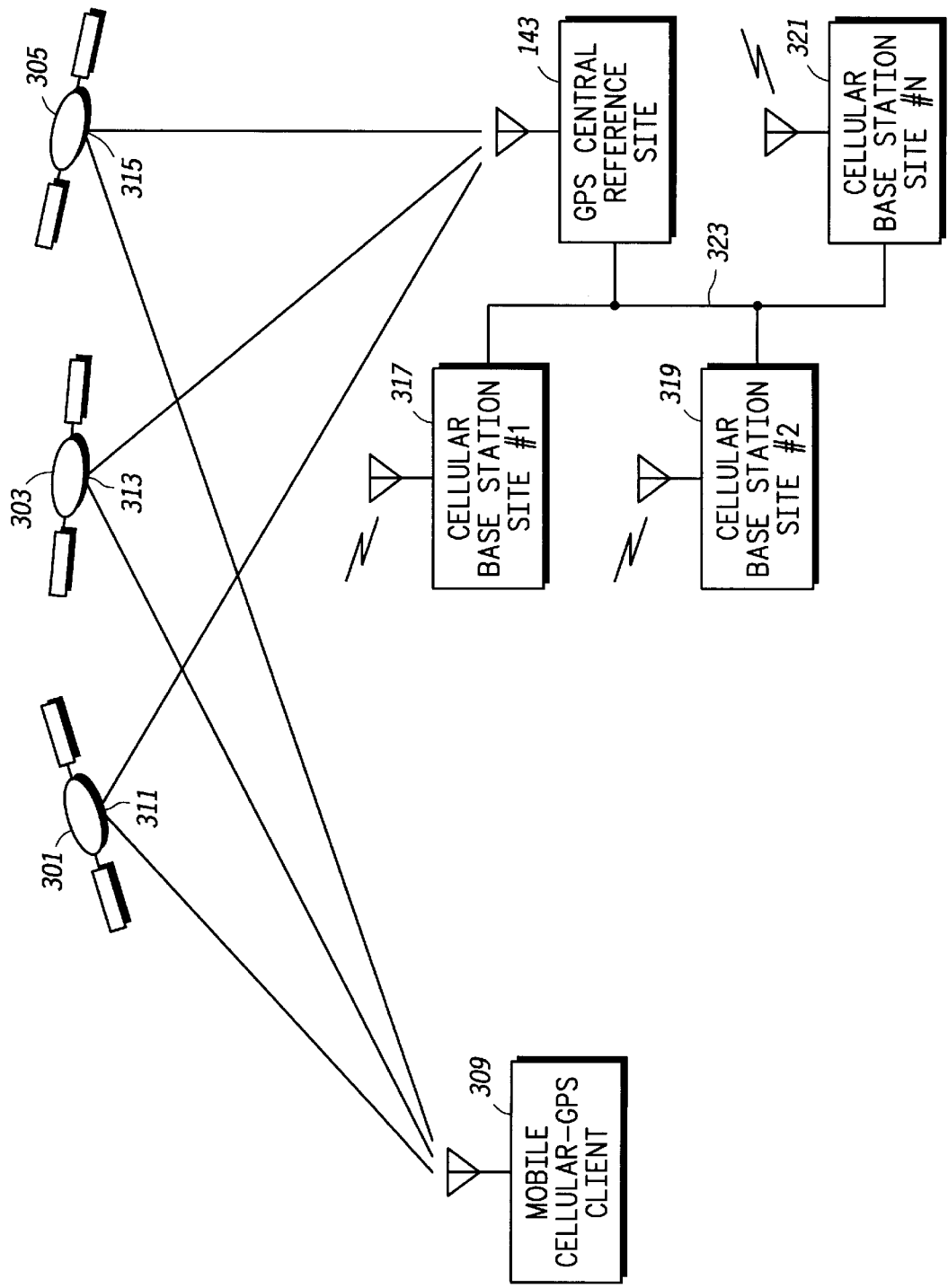
FIG. 3 is a system block diagram for carrying out various method embodiments described herein.

FIG. 3 shows an overall system block diagram for the system described here. Satellites 301, 303, 305 represent a portion of the NAVSTAR GPS satellite system that is visible at any given time to either or both a GPS central reference site 143 and a mobile cellular GPS client 309. Note that the mobile client can also be another type of receiver that can establish a wireless communication channel with the GPS central reference site 143.

The satellites 301, 303, 305 continually transmit signals 311, 313, 315 that are receivable by both GPS central reference site 143 and the mobile client 309.

The GPS central reference site 143 is coupled to cellular base stations such as those shown in reference numbers 317, 319, and 321 data aided information from this GPS central reference site is transmitted to each of these cellular base station sites 317, 319, and 321 via a communication link 323 and then transmitted from at least one of these cellular base station sites to the mobile client 309 via RF transmission.

Figure 4:
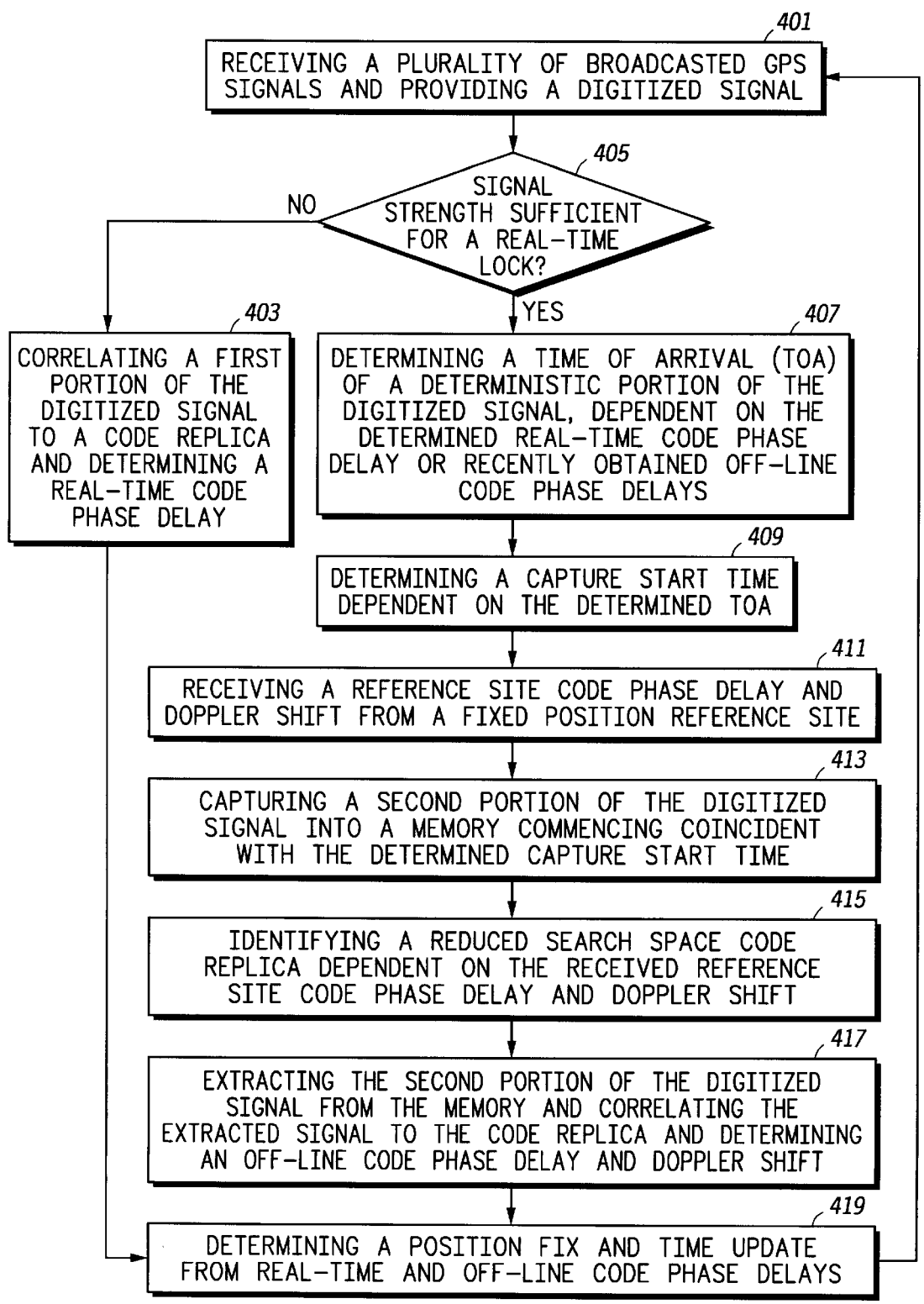
FIG. 4 is a flow chart illustrating preferred steps of a method embodiment of the invention.

FIG. 4 is a flowchart illustrating a method embodiment of the invention. The method steps shown in the flowchart are to be executed on the controller 137 shown in FIG. 1, in conjunction with the system shown in FIG. 3.

In FIG. 4 a position fix is computed dependent on the real-time or off-line code phase delay, which ever is available. Although a singular code phase delay is mentioned here, the position fix is computed from a multitude of code phase delays each associated with a different satellite. In practice, separate channels of the multi-channel correlator 129 will resolve or lock onto each of these satellites. If a particular satellite signal is of insufficient strength to track with a real-time correlator, then the off-line correlation process will be invoked for that satellite finding an off-line code phase delay. A position solution can then be computed that may include some code phases obtained from the real-time process as well as some code phases obtained from the off-line process. The solution to the off-line code phase delay includes the steps of receiving acquisition assist information from a GPS central reference site via a wireless link, or from predictions of code phase and Doppler from a recently tracked satellite in the real-time mode.

In step 401 the system 100 receives a plurality of broadcast GPS signals and provides a digitized signal. Referring back to FIG. 1 reference number 121 represents the digitized signal.

Next, in step 403 a first portion of the digitized signal 121 is correlated to a code replica that is generated or stored in the correlator 129 under the control of controller 137, and a real-time code phase delay and preferably a real-time Doppler shift is determined.

In step 405 the controller 137 checks to see if the correlation process is locking-on to the digitized signal using a real-time correlation process. To lock the correlation process must line up the first portion of the digitized signal to the code replica. If the signal 121 is too weak or the ambient noise level is too high the correlation process will not lock, an off-line correlation process that is invoked in parallel commencing at step 407.

In step 407 a Time Of Arrival (TOA) of a deterministic portion of the digitized signal is determined dependant on the determined real-time code phase delays or off-line code phase delays, both from a previous iteration. In the preferred embodiment the HOW, or hand-over word, is an example of the deterministic portion. Other portions of the satellite broadcasted 50 BPS data sequence are also deterministic and useable as well. For example, trailing bits of a first GPS satellite broadcast message sub-frame 203, and preamble bits of a second GPS satellite broadcast message sub-frame 205 immediately following the first GPS satellite broadcast message sub-frame 203 are also deterministic. Also, the SFID or SubFrame Identifier shown in segment C 217 qualifies as deterministic data.

Next, in step 409 a capture start time is determined dependent on the determined TOA. This capture start time will be used in the off-line correlation process.

In step 411 a reference code phase delay and a reference Doppler shift are received from a fixed position reference site. Alternately, if the particular satellite was recently tracked by the real-time process, estimates of the code phase and Doppler can be obtained from the recently tracked real-time code phase and Doppler.

An off-line correlation process commences at step 413. In step 413 a second portion of the digitized signal is captured into a memory 117 commencing coincident with the capture start time determined in step 411. This second portion includes one or more of the deterministic data patterns described above, such as the message preamble, the HOW, or the SFID.

Next, in step 415 a reduced code replica search space is identified dependent on the received reference code phase delay and reference Doppler shift or predicted code phase and Doppler shift from recently tracked real-time signal processing.

Then, in step 417 the second portion of the digitized signal is extracted from the memory and correlated to the reduced code replica search space just determined, and an off-line code phase delay and off-line Doppler shift is determined. The process of step 417 can be executed in software only in the controller 137 or can be executed using the multi-channel correlator 129. The second portion of the signal 123 is extracted from memory 117 and routed through a switch 125 under the direction of the controller 137.

The extraction of the signal 123 from the memory 117 and the correlation process, if the multi-channel correlator 129 is used, can be executed at a very high rate of speed typically 10 to 100 times the speed of the normal real-time correlation process. Because of this increased speed, using the off-line data correlation process, lock can be effected much faster than in a typical real-time correlation process.

In step 419 a position fix is computed dependent on the off-line code phase delay, the determined real-time code phase delay, or a combination of off-line and real-time code phase delays. Although a singular code phase delay is mentioned here, the position fix is computed from a multitude of code phase delays each associated with a different satellite. Each satellite code phase can be obtained from either a real-time process or an off-line process, and the code phases combined to compute a position fix.

Because the real-time code phase delay is used to determine a capture start time for data to later be correlated via the off-line process, the correlation lock time can be significantly reduced and signal processing gain is inherently increased because a coherent off-line correlation process is used, coherency established based on the determined capture start time and known 50 BPS satellite broadcast data sequence. Moreover, since the reference code phase delay and a reference Doppler shift are received from the reference site and the portion of the code replica is used the off-line correlation time can be reduced to a matter of seconds. This is vital in a portable radiotelephone application, especially because a conventional position fix, even if all satellites are locking on can take 30 or more seconds. Using the fixed site data correlation can be reduced to a matter of seconds.

Figure 5:
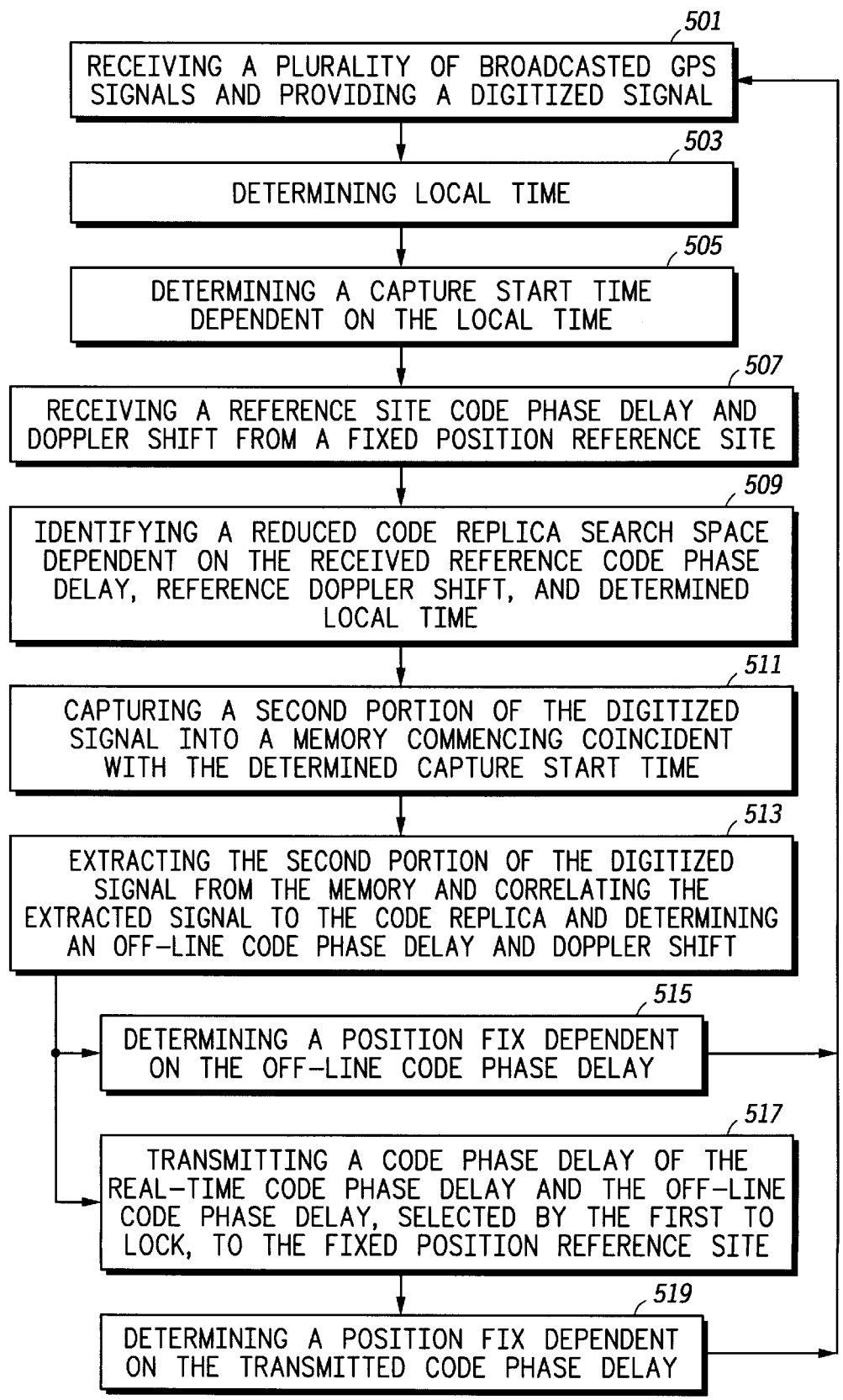
FIG. 5 is a flow chart showing preferred steps of another method embodiment of the invention.

Next, another embodiment as shown in FIG. 5 will be detailed that relies on using local time to greatly aid the speed of the position acquisition process.

FIG. 5 is a flow chart showing preferred steps of another method embodiment of the invention.

In step 501 the system 100 receives a plurality of broadcast GPS signals and provides a digitized signal.

Next in step 503 a local time is determined. The local time can be determined via the following techniques. In many applications of wireless technology such as CDMA and two-way paging, the wireless device, via the communications protocol, has a way of developing accurate GPS time because the data protocol from the infrastructure to the wireless device is synchronized to GPS. As such, the mobile device can itself synchronize to GPS time.

Another technique includes transferring absolute GPS time from the GPS into a local Real Time Clock (RTC) during times in which real-time or off-line signals can be obtained, for example, block 155 of FIG. 1. The accuracy of such a real-time clock is very good just after being set from GPS, on the order of tens of nanoseconds. Subsequently, the accuracy of the RTC slowly degrades dependent on the stability of the reference oscillator that is driving the real-time clock. As the error in the real-time clock grows due to this free-running drift, the accuracy of the code phase and Doppler predictions and the capture start time that are developed from this RTC will degrade. It is possible to have the RTC periodically calibrated by powering up the GPS, performing off-line code phase measurements, obtaining a measure of position and local time from the off-line measurements, and then updating the RTC so as to keep the RTC accurate for future measurements. The frequency of such periodic updates is no more than once every 10 minutes or so (assuming a 1 PPM reference oscillator, well within the capability of today's wireless devices), thus the total power consumption is well managed by periodically updating the local time reference from GPS. The drift rates and the rate of periodic update of such a system is dependent on the reference oscillator stability.

Figure 8:
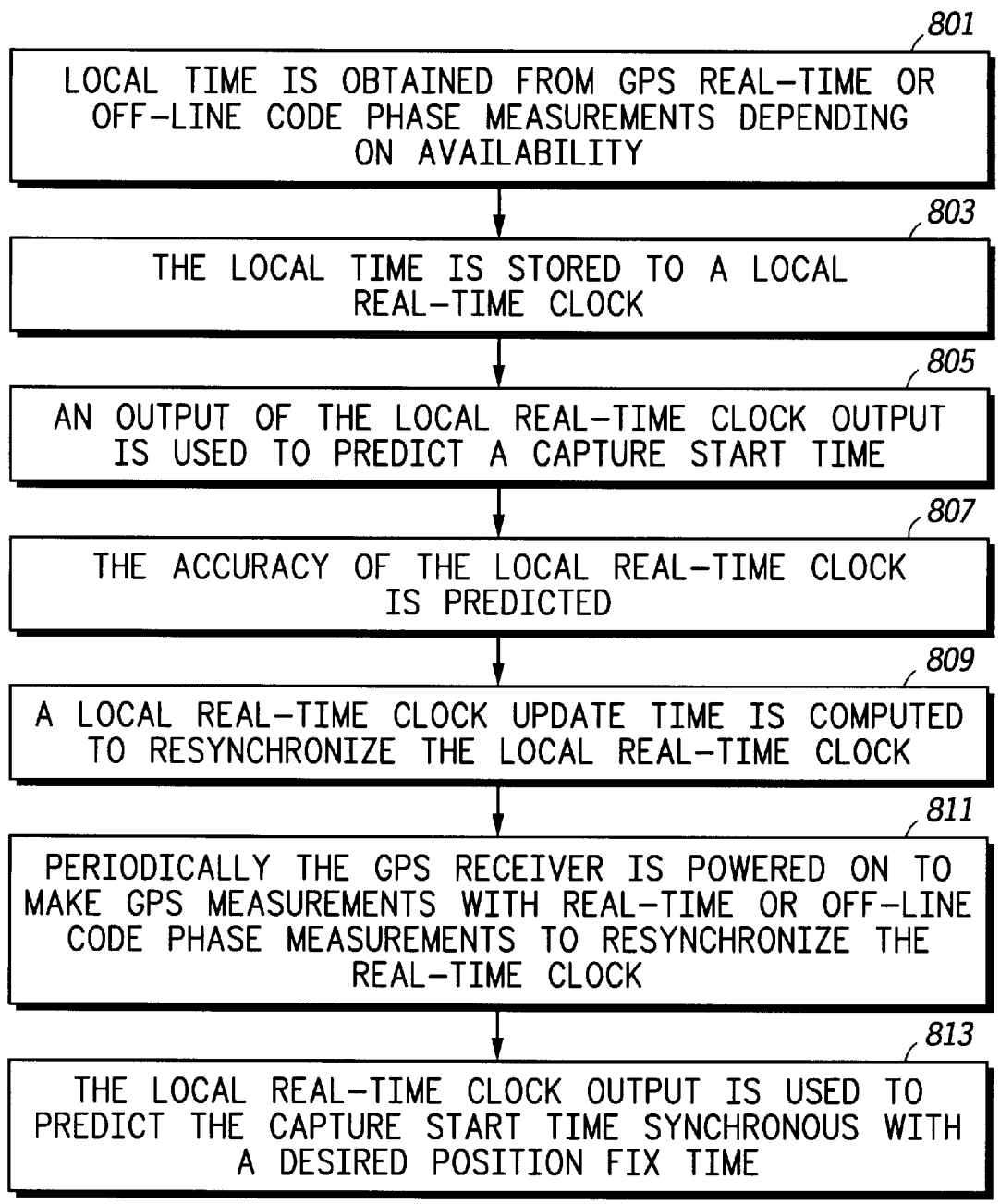
FIG. 8 is a flow chart demonstrating a method for determining local time.

Digressing for a moment FIG. 8 is a flow chart demonstrating a preferred method for determining local time.

In step 801 local time is obtained from GPS real-time code phase measurements.

Next, in step 803 the local time is stored to a local real-time clock. Note that the local real-time clock runs from a free-running reference oscillator, and the accuracy of the local real-time clock is dependent on stability of the free-running reference oscillator.

Then, in step 805 an output of the local real-time clock output is used to predict a capture start time.

Next, in step 807 the accuracy of the local real-time clock is predicted.

In step 809 a local real-time clock update time is computed to resynchronize the local real-time clock.

Then, in step 811 the GPS receiver is periodically powered on to make GPS measurements with real-time code phase measurements or off-line code phase measurements to resynchronize the local real-time clock.

In step 813 the local real-time clock output is used to predict the capture start time synchronous with a desired position fix time.

Returning to FIG. 5, in step 505 a capture start time is determined based on the local time for each satellite in view.

Next, in step 507 reference code phase delays and reference Doppler shifts are received from the fixed position reference site 143 for all satellites of the constellation 147 that are in sight. This information is received via a secondary communication channel available either through a cellular radiotelephone channel such as a CDMA cellular radiotelephone or a wireless paging channel, or other separate communication channel. Here the wireless communications receiver 139 is used. The fixed position reference site is a permanent site that receives signals from satellites in view on a regular basis. This reference site computes it's own position fix and from measurements of code phase delay and Doppler shift from each of the satellites in view. This information is used to augment or speed up the correlation process in the remote receiver 100.

Then in step 509 a reduced code replica search space is determined dependent on the one of the received reference code phase delays, reference Doppler shift, and determined local time. Preferably this is done for each satellite.

In step 511 a second portion of the digitized signal 121 is captured into memory 117 commencing coincident with the determined capture start times.

Next, in step 513 the second portion of the digitized signal is extracted from the memory 117 and correlated to the reduced code replica search space and to determine an off-line code phase delay. This can be accomplished strictly by software in the controller 137 or with the aid of the multi-channel correlator 129. Of course this reference site information aided correlation can operate at a very high speed much faster than the real-time correlation ordinarily happens.

Depending on the installed configuration the off-line code phase delay can be used to compute a position fix locally as shown in step 515, or transmitted in step 517 via the wireless communications receiver 139 to the GPS central reference site 143 which will compute the position fix as shown in step 519.

An improved GPS signal acquisition method and system has been detailed. By lengthening a pre-detection integration interval weak signals can be detected. The signal detection improvement is accomplished by capturing and operating on synchronously captured GPS satellite signals. Coherency is ensured by relying on the predictability of the satellite signal's data pattern. To speed up both the real-time and off-line correlation process a reduced code replica search space is derived dependent on a reference code phase delay and reference Doppler shift, and optionally local time received from a fixed position reference site. Also, the off-line correlation process can be run at a speed significantly faster than the real-time correlation process. A position fix can be either computed locally, or remotely at the fixed position reference site. The first signal to lock associated with the real-time code phase delay and the off-line code phase delay is sent to the fixed position reference site. By applying all of the described techniques position determining data can be typically acquired within a few seconds rather than tens of seconds, even in weak signal areas. This allows for energy conservation—an important feature in portable devices, and makes E911 service viable in a portable product.

What is claimed is:

1. A method for determining position fix by interpreting a plurality of broadcasted GPS signals comprising the steps of:

receiving the plurality of broadcasted GPS signals and providing a digitized signal dependent thereon;

correlating a first-portion of the digitized signal to a code replica and determining a real-time code phase delay;

determining a Time Of Arrival (TOA) of a deterministic portion of the digitized signal, dependent on the determined real-time code phase delay;

determining a capture start time dependent on the TOA;

receiving a reference code phase delay and a reference Doppler shift, from a fixed position reference site;

capturing a second portion of the digitized signal into a memory commencing coincident with the determined capture start time;

identifying a reduced code replica search space dependent on the received reference code phase delay and reference Doppler shift; and extracting the second portion of the digitized signal from the memory and correlating the extracted signal to the reduced code replica search space and determining an off-line code phase delay.

2. A method in accordance with claim 1 further comprising a step of determining an off-line Doppler shift dependent on a rate of change of the determined off-line code phase delay.

3. A method in accordance with claim 1 further comprising a step of determining loss of correlation lock, and wherein the step of capturing a second portion of the digitized signal into a memory is executed when the loss of correlation lock is determined.

4. A method in accordance with claim 1 wherein the step of extracting and correlating, occurs at a rate greater than the step of correlating the first portion of the digitized signal to a code replica.

5. A method in accordance with claim 1 wherein the second portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

6. A method in accordance with claim 1 wherein the second portion of the digitized signal captured into memory comprises a hand-over word.

7. A method in accordance with claim 1 further comprising a step of computing a position fix dependent on the determined off-line code phase delay.

8. A method in accordance with claim 1 further comprising the steps of:
   determining loss of correlation lock for a first satellite; then
   requesting a reference code phase delay associated with the first satellite from the fixed position reference site; and
   wherein the step of receiving a reference code phase delay comprises receiving the requested reference code phase delay associated with the first satellite.

9. A method in accordance with claim 1 further comprising a step of determining a real-time Doppler shift dependent on a rate of change of the determined real-time code phase delay.

10. A method for determining position fix by interpreting a plurality of broadcasted GPS signals comprising the steps of:
    receiving the plurality of broadcasted GPS signals and providing a digitized signal dependent thereon;
    determining local time;
    determining a capture start time dependent on the determined local time;
    receiving a reference code phase delay and a reference Doppler shift, from a fixed position reference site;
    identifying a reduced code replica search space dependent on the received reference code phase delay, reference Doppler shift, and determined local time;
    capturing a second portion of the digitized signal into a memory commencing coincident with the determined capture start time; and
    extracting the second portion of the digitized signal from the memory and correlating the extracted signal to the reduced code replica search space and determining an off-line code phase delay.

11. A method in accordance with claim 10 further comprising a step of determining an off-line Doppler shift dependent on a rate of change of the determined off-line code phase delay.

12. A method in accordance with claim 10 further comprising a step of computing a position fix dependent on the determined off-line code phase delay.

13. A method in accordance with claim 10 further comprising a step of correlating a first portion of the digitized signal to a code replica and determining a real-time code phase delay; and
    wherein the step of extracting and correlating, occurs at a rate greater than the step of correlating the first portion of the digitized signal to a code replica.

14. A method in accordance with claim 10 wherein the second portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

15. A method in accordance with claim 10 wherein the second portion of the digitized signal captured into memory comprises a hand-over word.

16. A method in accordance with claim 10 wherein the step of determining local time comprises a step of determining local time dependent on local time representation in a wireless communications device.

17. A method in accordance with claim 16 wherein wireless communications device is a radio-telephone.

18. A method in accordance with claim 16 wherein wireless communications device is a pager.

19. A method in accordance with claim 10 further comprising the step of:
    correlating a first portion of the digitized signal to the reduced code replica search space and determining a real-time code phase delay; and
    wherein the step of computing a position fix comprises a step of computing a position fix dependent on the determined real-time code phase delay.

20. A method in accordance with claim 10 wherein the step of determining local time comprises the steps of:
    obtaining local time from GPS real-time code phase measurements;
    storing the local time to a local real-time clock, wherein the local real-time clock runs from a local reference oscillator, accuracy of the local real-time clock dependent on stability of the local reference oscillator;
    using a local real-time clock output to predict capture start time;
    predicting the accuracy of the local real-time clock;
    computing a local real-time clock update time dependent on the predicted accuracy of the local real-time clock to resynchronize the local real-time clock; and
    periodically powering on a GPS receiver to make GPS measurements with real-time code phase measurements to resynchronize the local real-time clock.

21. A method in accordance with claim 10 wherein the step of determining local time comprises the steps of:
    obtaining local time from GPS off-line code phase measurements;
    storing the local time to a local real-time clock, wherein the local real-time clock runs from a local reference oscillator, accuracy of the local real-time clock dependent on stability of the local reference oscillator;
    using a local real-time clock output to predict capture start time;
    predicting the accuracy of the local real-time clock;
    computing a local real-time clock update time dependent on the accuracy of the local real-time clock to resynchronize the local real-time clock;
    using the local real-time clock output to predict the capture start time synchronous with a desired position fix time; and
    periodically powering on a GPS receiver to make GPS measurements with off-line code phase measurements to resynchronize the local real-time clock.

22. A method for determining position fix by interpreting a plurality of broadcasted GPS signals comprising the steps of:
    receiving the plurality of broadcasted GPS signals and providing a digitized signal dependent thereon;

determining local time;

determining a capture start time dependent on the determined local time;

receiving a reference code phase delay and a reference Doppler shift, from a fixed position reference site;

identifying a reduced code replica search space dependent on the received reference code phase delay, reference Doppler shift, and determined local time;

correlating a first portion of the digitized signal to the reduced code replica search space and determining a real-time code phase delay for a first satellite;

capturing a second portion of the digitized signal into a memory commencing coincident with the determined capture start time;

extracting the second portion of the digitized signal from the memory and correlating the extracted signal to the portion of the code replica and determining an off-line code phase delay for the first satellite; and transmitting a code phase delay of the real-time code phase delay and the off-line code phase delay, selected by the first to lock, to the fixed position reference site.

23. A method in accordance with claim 22 wherein the step of determining local time comprises a step of determining local time dependant on local time representation in a wireless communications device.

24. A method in accordance with claim 23 wherein wireless communications device is a radio-telephone.

25. A method in accordance with claim 23 wherein wireless communications device is a pager.

26. A method in accordance with claim 22 further comprising the step of determining a position fix dependent on the transmitted code phase delay.

27. A Global Positioning System (GPS) receiver comprising:

a GPS front-end for receiving a plurality of broadcasted GPS signals and providing a digitized signal dependent thereon;

a first correlator operatively couplable to the front-end for correlating a first portion of the digitized signal to a code replica and determining a Time Of Arrival (TOA) of a deterministic portion of the digitized signal dependent on a determined real-time code phase delay, then determining a capture start time dependent on the TOA;

a wireless communications receiver for receiving a reference code phase delay and a reference Doppler shift, from a fixed position reference site, and for identifying a portion of the code replica dependent thereon; and a memory operably coupled to the front-end for capturing a second portion of the digitized signal into a memory commencing coincident with the determined capture start time, and wherein the first correlator is operably couplable to the memory for extracting the second portion of the digitized signal from the memory and correlating the extracted signal to a reduced code replica search space dependent on the received reference code phase delay and reference Doppler shift, and determining an off-line code phase delay.

* * * * *